US007973438B2

(12) United States Patent
Mashino

(10) Patent No.: US 7,973,438 B2
(45) Date of Patent: Jul. 5, 2011

(54) AC GENERATOR FOR VEHICLES
(75) Inventor: Mikio Mashino, Kariya (JP)
(73) Assignee: Denso Corporation, Kariya (JP)
( * ) Notice: Subject to any disclaimer, the term of this patent is extended or adjusted under 35 U.S.C. 154(b) by 6 days.
(21) Appl. No.: 12/385,400
(22) Filed: Apr. 7, 2009
(65) Prior Publication Data
US 2009/0251019 A1   Oct. 8, 2009
(30) Foreign Application Priority Data

Apr. 7, 2008   (JP) .................................. 2008-099103

(51) Int. Cl.
*H02K 19/16* (2006.01)
*H02K 19/36* (2006.01)
*H02K 11/04* (2006.01)
(52) U.S. Cl. ........................ 310/68 D; 310/89; 310/71
(58) Field of Classification Search .............. 310/68 D, 310/88, 89, 71; 74/6, 7 R; 363/141, 144, 363/145
See application file for complete search history.

(56) References Cited

U.S. PATENT DOCUMENTS 6,150,741 A * 11/2000 Hayashi et al. ............. 310/68 D
6,215,216 B1 * 4/2001 Miyamoto et al. ............. 310/89
6,528,912 B2 * 3/2003 Asao ........................... 310/68 D
6,664,675 B2 * 12/2003 Kaizu ......................... 310/68 D
2006/0258540 A1 11/2006 Yanagisawa et al.

FOREIGN PATENT DOCUMENTS

| JP | A-2000-32720 | 1/2000 |
| JP | A-2002-119008 | 4/2002 |
| JP | A-2006-320066 | 11/2006 |

OTHER PUBLICATIONS

Japanese Office Action issued on Nov. 24, 2009 in Japanese Patent Application No. 2008-099103 (with translation).

* cited by examiner

*Primary Examiner* — Tran N Nguyen
(74) *Attorney, Agent, or Firm* — Oliff & Berridge, PLC

(57) ABSTRACT

AC generator for vehicles is provided with a frame that supports a rotor and a stator, a rectifier that rectifies an output of the stator and has an output terminal, and a rear cover that covers electric parts including the rectifier. The rear cover is provided with a drain hole in the side part of the output terminal, and a wall part that adjoins the drain hole provided in the output terminal side.

5 Claims, 5 Drawing Sheets

FRONT ← → REAR

AC GENERATOR FOR VEHICLES

CROSS-REFERENCE TO RELATED APPLICATION

This application is based on and claims the benefit of priority from earlier Japanese Patent Application No. 2008-99103 filed on Apr. 7, 2008, the description of which is incorporated herein by reference.

BACKGROUND OF THE INVENTION

1. Technical Field of the Invention

The present invention relates to an AC generator for vehicles equipped in a car, a track, and the like.

2. Description of the Related Art

Referring to Japanese Patent Application Laid-open Publication No. 2002-119008, for example, an AC generator for vehicles having a structure for water draining in the direction of a ground surface at the time of assembling to the vehicle is known.

In the AC generator for vehicles disclosed in the above-mentioned publication, the drain canal having a concave-like shape when seen from an opening portion is provided on a rear cover in an outer domain of a brush system, while a drain hole is provided in the drain canal.

By the way, in order to prevent an output terminal to be soaked from incoming water and its gathering in the conventional generator for vehicles, the output terminal is positioned upwardly as much as possible that makes the output terminal to face opposite to the ground surface.

However, by making the vehicle compact, the space provided in its engine compartment becomes smaller so that the output terminal of the AC generator for vehicles may be positioned facing toward the ground surface.

Although the output terminal of the above-mentioned publication is not facing toward the ground surface, a pulley is positioned upwardly so that the output terminal is positioned near the ground surface.

When the output terminal of the AC generator for vehicles is positioned facing toward the ground surface, since the output terminal is a part where current concentrates, there is a possibility of problems arising, such as excessive heat generation, output failure, or the like, which would happen due to the large current leak if the output terminal and its circumference are short-circuited in connection with the water soaking.

In addition, there is a possibility that the problem by the generated heat may arise when the output terminal and radiation fins of a rectifier corrode due to the water soaking, and the contact resistance between them increases. Therefore, a structure that can drain the water without allowing it to collect near the output terminal is needed.

The present invention has been made in order to solve the issue described above, and has as its object to provide an AC generator for vehicles that can prevent the direct water soaking of an output terminal.

SUMMARY OF THE INVENTION

In order to solve the subject mentioned above, an AC generator for vehicles comprises a frame that supports a rotor and a stator, a rectifier that rectifies an output of the stator and has an output terminal, and a rear cover that covers electric parts including the rectifier. In addition, the rear cover is provided with a drain hole in the side part of the output terminal, and a wall part that adjoins the drain hole provided in the output terminal side.

By this, when water entering the rear cover reaches the vicinity of the output terminal, the water will be caught by the wall portion, and will be drained out from the rear cover efficiently through the drain holes, and the direct water soaking of the output terminal can be prevented.

As for the rear cover mentioned above, it is preferred to have a ventilating window for introducing cooling air into an area that faces the rectifier. Or as for the output terminal mentioned above, it is preferred to be facing toward a ground surface at the time of assembling the AC generator to a vehicle.

As for the drain hole and wall part that were mentioned above, it is preferred to be provided on both sides of the output terminal on the rear cover in the direction along a circumference of the rear cover.

Further, it is preferred that the rectifier mentioned above has a radiating fin, to which the output terminal is fixed, and the wall part has a height set so that the adjoining part of the output terminal and the radiating fin is covered when seen through the drain holes from outside of the rear cover.

DETAILED DESCRIPTION OF THE PREFERRED EMBODIMENTS

With reference to the accompanying drawings, hereinafter will be described an embodiment of the present invention.

Figure 1:
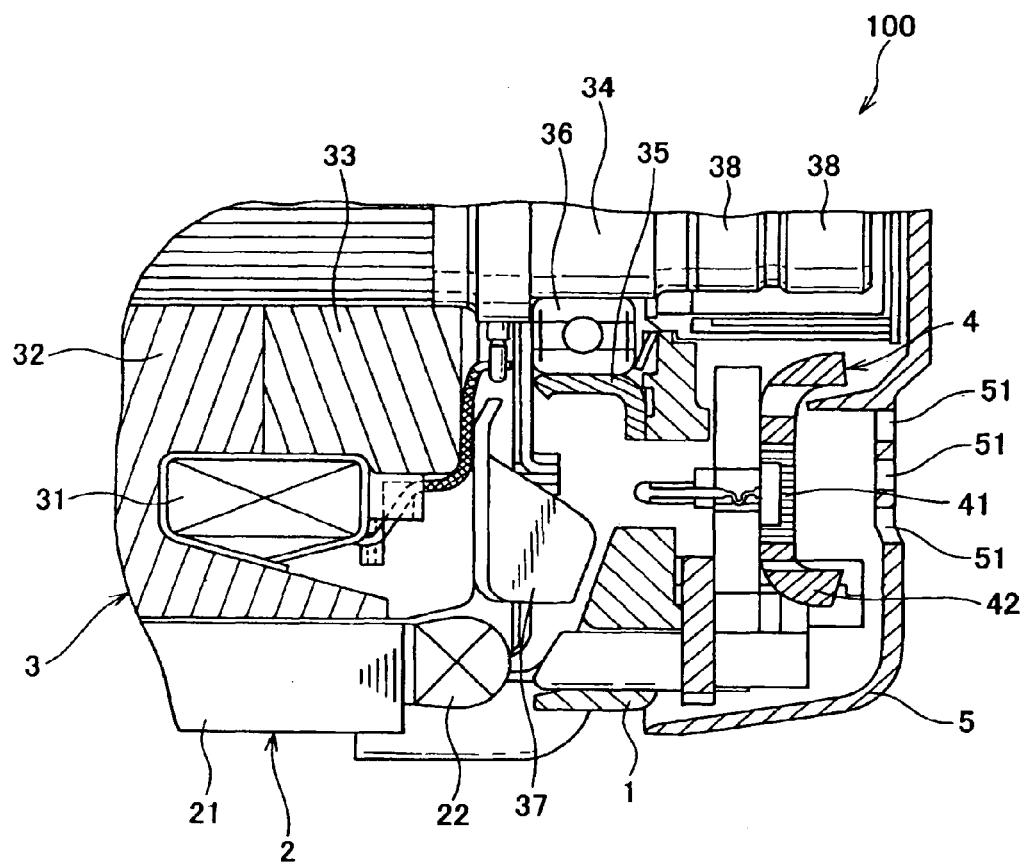
FIG. 1 shows the partial sectional view of an AC generator for vehicles of an embodiment.

FIG. 1 is a partial sectional view of an AC generator for vehicles. The AC generator 100 for vehicles (hereinafter, shortened to "the AC generator 100") of the present embodiment shown in FIG. 1 is constituted including a frame 1, a stator 2, a rotor 3, a rectifier 4, a rear cover 5 and the like. It should be appreciated that directions for front and rear are introduced in the figure for convenience, in order to explain the AC generator.

The stator 2 is provided with a stator iron core 21 and a stator winding 22. Both rear and front sides of the frame 1 have a form of a bowl, and are mutually fixed with a plurality of bolts (not shown) in the state where the stator iron core 21 of the stator 2 is sandwiched between the openings of the rear and front sides of the frame 1.

The rotor 3 has a field winding 31, pole cores 32 and 33, a rotating shaft 34 and the like, and is supported rotationally by a pair of bearings 36 fixed to the bearing box 35 that is arranged in the rear and front sides of the frame 1. Cooling fans 37 are attached in the end surface (in a direction of its axis) of the pole cores 32 and 33.

In addition, a pulley (not shown) is connected to a front end of the rotating shaft 34 with a nut (not shown), and is driven by an engine (not shown). Further, a pair of collector rings 38 are formed in the rear end of the rotating shaft 34 located in the outside of the rear side of the frame 1, and the collector rings 38 are connected electrically to the field winding 31.

So-called electric parts, such as the rectifier 4, an armature-voltage-controlling device (not shown), a brush device (not shown), and the like are fixed to the end surface (in a direction of its axis) of the rear side of the frame 1 by fixing means, such as a bolt (not shown).

The rectifier 4 is to change a three-phase alternating current voltage that is the output voltage of the three-phase stator winding 22 into a direct current (DC) output voltage by rectifying. The rectifier 4 is provided with a radiating fin 42 with which a rectifier element 41 is fixed, and an output terminal (mentioned later) joined to the radiating fin 42.

The rear cover 5 made of resin is a protective cover as an outside shell portion. The rear cover 5 covers and protects the rectifier 4, the armature-voltage-controlling device, the brush device, and the like that are attached on the outside of the rear side of the frame 1.

The rear cover 5 is fixed by tightening a bolt (not shown) extended from the rear side of the frame 1 with a nut (not shown) where the rectifier 4 is put therebetween.

Figure 2:
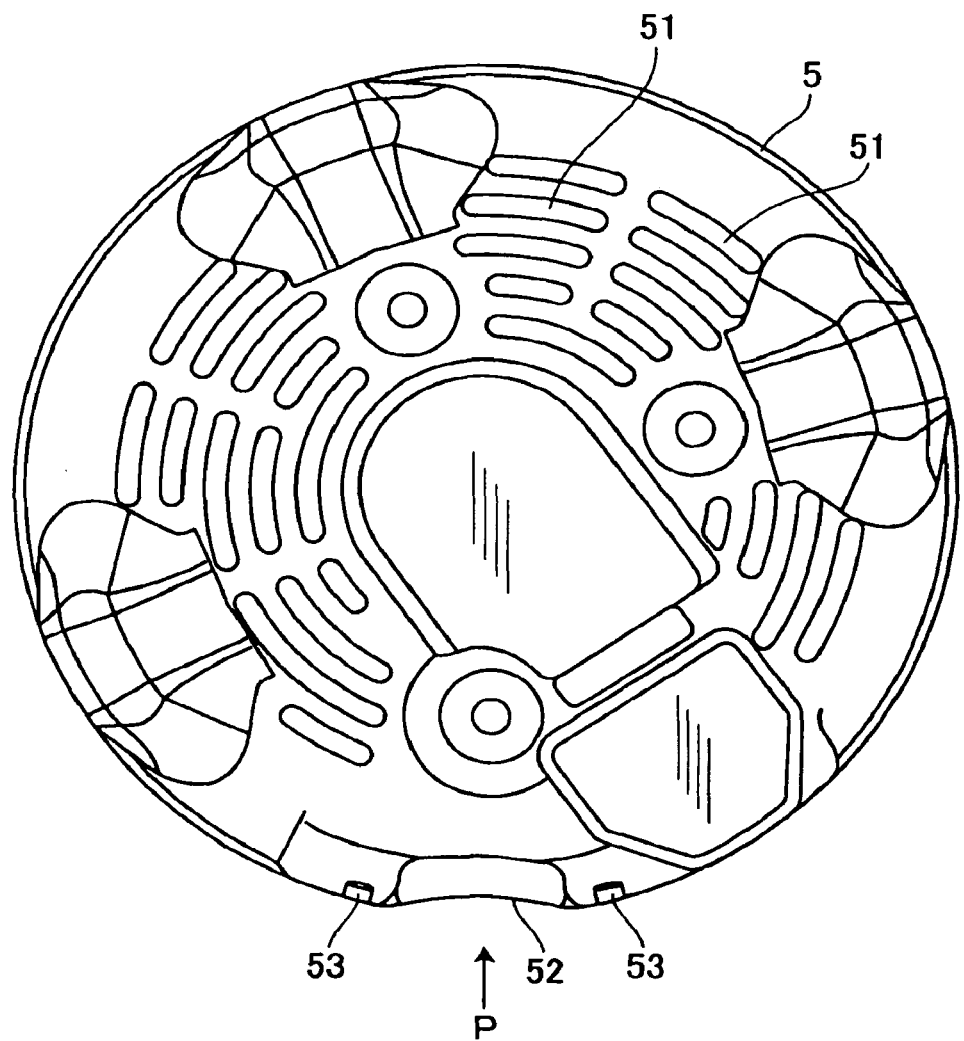
FIG. 2 shows the plane view of a rear cover.
Figure 3:
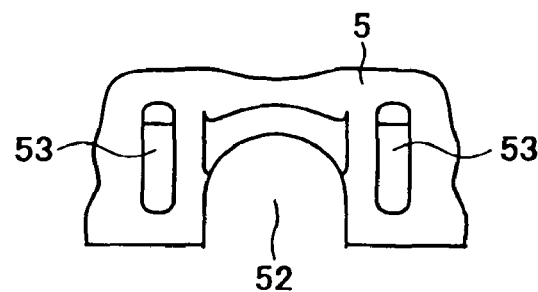
FIG. 3 shows the partial side view seen from the direction P of the rear cover shown in FIG. 2.
Figure 4:
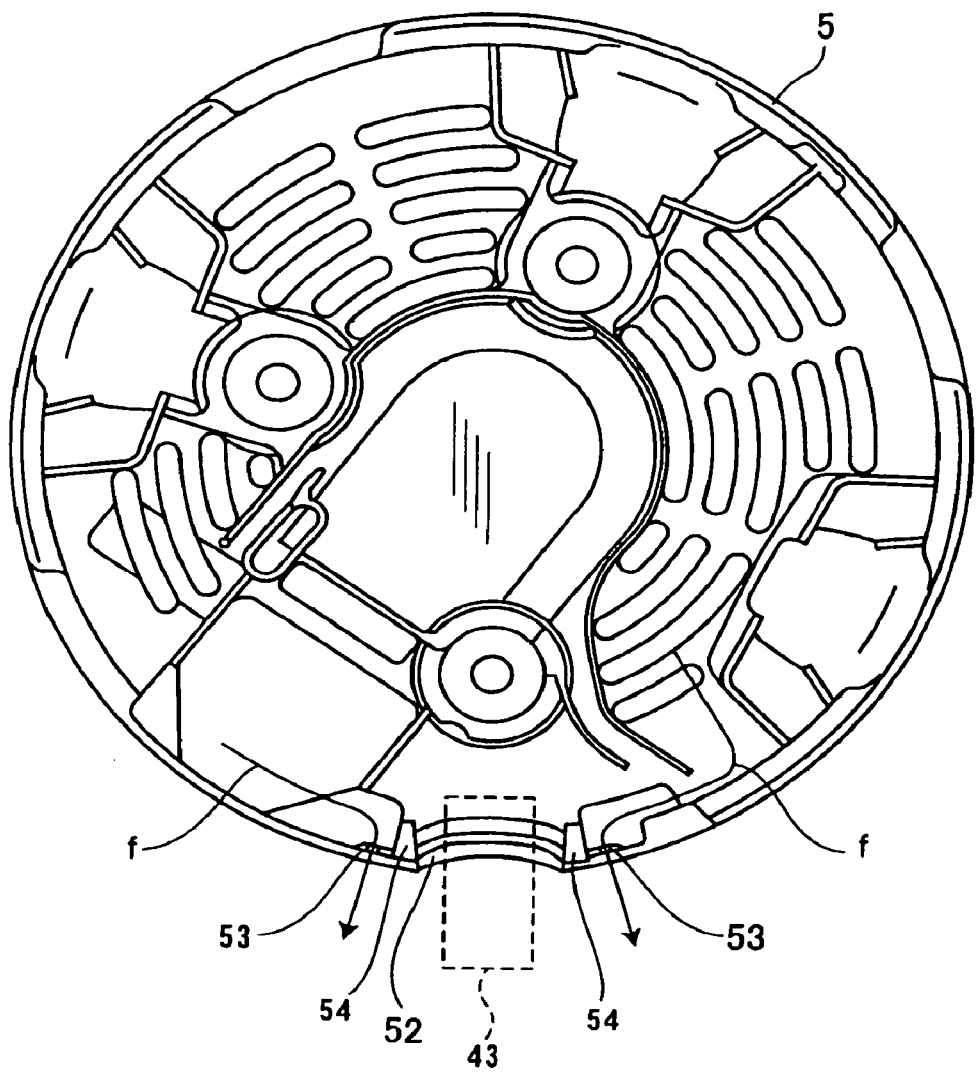
FIG. 4 shows the view seen from the inner side of the rear cover.
Figure 5:
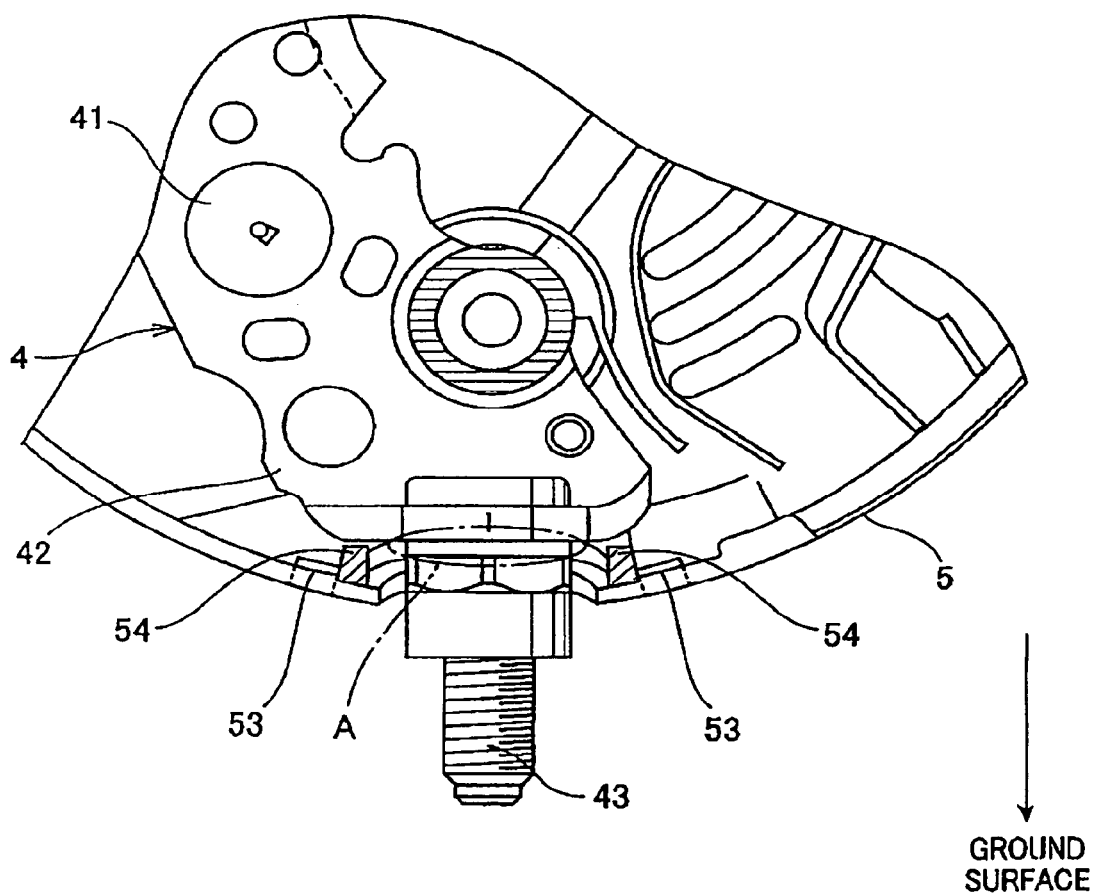
FIG. 5 shows the state where the rear cover and the rectifier were assembled.
Figure 6:
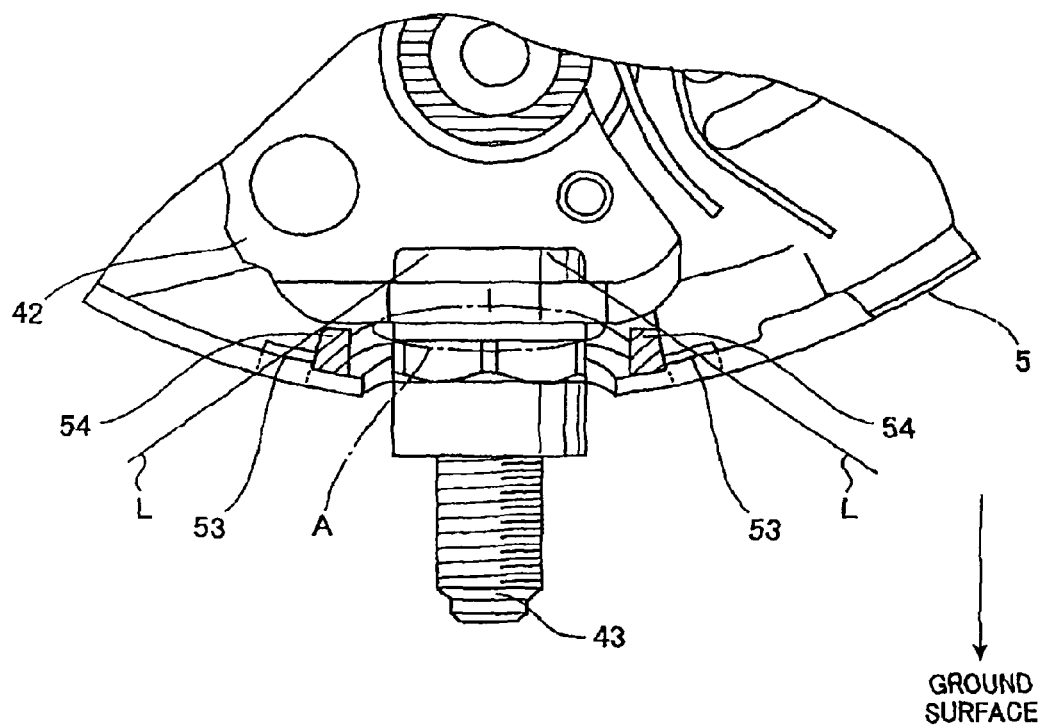
FIG. 6 shows an enlarged view of the rear cover shown in FIG. 5 with straight lines L that pass the inside edges of the wall portion 54.

Next, the detailed form of the rear cover 5 is explained. FIG. 2 is a plane view of the rear cover 5; FIG. 3 is a partial side view seen from the direction P of the rear cover 5 shown in FIG. 2; FIG. 4 is a figure seen from the inner side of the rear cover 5; and FIG. 5 is a figure showing the state where the rear cover 5 and the rectifier 4 were assembled.

As shown in above-mentioned figures, the rear cover 5 is provided with a plurality of ventilating windows 51, a U-shaped concave portion 52, two drain holes 53, and a wall portion 54.

The plurality of ventilating windows 51 is for introducing cooling air into the rear cover 5 generated by the rotation of the cooling fan 37 equipped with the rotor 3. The U-shaped concave portion 52 penetrates the output terminal 43 that is equipped in the rectifier 4.

The windows 53 for drain are provided and penetrated through the both sides of concave portion 52. The wall portions 54 are located in the position adjoining to each drain hole 53, and are projected to the inner circumference side of the rear cover 5.

It should be appreciated that in the AC generator 100 of the present embodiment, the position of the output terminal 43 is set so that it faces the direction of the ground surface at the time of assembling the AC generator 100 to the vehicle.

A plurality of ventilating windows 51 is formed on the end surface (in a direction of its axis) of the rectifier 4 corresponding to the radiating fin 42. Making a part of an end of an opening side in the side into a concave shape forms the concave portion 52. The drain holes 53 have a rectangular-like shape parallel to the rotating shaft 34. The drain holes 53 are provided on both sides of the concave portion 52 in the direction along a circumference of the sides of the concave portion 52, i.e. both sides of the output terminal 43.

As shown in FIG. 5, in the state of assembling the AC generator 100, the wall portion 54 (hatched in FIG. 5) adjoins the drain holes 53, and is provided in the output terminal 43 side. In addition, the height of the wall portion 54 is set so that the adjoining part of the output terminal 43 and the radiating fin 42 (domain shown by A in FIG. 5) is covered when seen through the drain holes 53 from outside of the rear cover 5.

Thus, in AC generator 100 of the present embodiment, the rear cover 5 has the drain holes 53 provided in the side part of the output terminal 43, and the wall portion 54 that adjoins the drain holes 53 provided in the output terminal 43 side.

By this, when the water that entered into the rear cover 5 reaches near the output terminal 43, the water will be caught by the wall portion 54, and will be drained out from the rear cover 5 efficiently through the drain holes 53, and the direct water soaking of the output terminal 43 can be prevented. The drain course of the water is shown by arrow f in FIG. 4.

Especially in the case of the rear cover 5 which has the ventilating windows 51 for introducing the cooling air into the area that faces the rectifier 4, although the quantity of the water that enters into the inside of the rear cover 5 increases, the direct water soaking of the output terminal 43 can be reliably prevented. Even if the output terminal 43 faces the ground surface at the time of assembling to the vehicle, direct water soaking of the output terminal can be prevented reliably.

Since the drain holes 53 and the wall portion 54 are formed in both sides of the rear cover 5 along with the side in the direction of a circumference on both sides of the output terminal 43, efficient drainage from both sides of the output terminal 43 is possible, and further can raise the waterproofing effect of the output terminal 43.

Since the height of the wall portion 54 is set so that the adjoining part of the output terminal 43 and the radiating fin 42 is covered when seen through the drain holes 53 from outside of the rear cover 5, even if the water enters into the rear cover 5 through the drain holes 53 from the ground surface direction by tires, the water entering into the rear cover 5 does not reach directly to the adjoining part of the output terminal 43 and the radiating fin 42, and corrosion of the adjoining part due to water soaking can be prevented.

This invention is not limited to the above-mentioned embodiment, and various modification implementations are possible for it within the limits of the summary of this invention.

Although the embodiment mentioned above explained the AC generator with the output terminal 43 facing toward the ground surface, this invention may be applicable even if it is the case where direction of an output terminal 43 is shifted from the ground surface.

Since the drain holes 53 and the wall portion 54 are especially formed in the both sides of the output terminal 43, the water that reached near the output terminal 43 can be reliably drained to the outside of the rear cover 5 irrespective of the direction shifted.

In addition, when the direction of the output terminal 43 is shifted away from the ground surface, or when the water is drained through one of the drain holes 53, even though the output terminal 43 is facing toward the ground surface, the drain hole 53 with many water displacements may be left while the other drain hole 53 may be omitted.

What is claimed is:

1. An alternating current (AC) generator for vehicles comprising:
a frame that supports a rotor and a stator,
a rectifier that rectifies an output of the stator and has an output terminal, and
a rear cover that covers electric parts including the rectifier, wherein, the rear cover is provided with a drain hole in a side part of the output terminal,
a wall part that adjoins the drain hole provided in an output terminal side,
the rotor has a rotating shaft, and the output terminal is arranged so as to penetrate a penetrating portion of the rear cover in a direction perpendicular to an axial direction of the rotating shaft,
the wall portion is formed between the penetrating portion of the rear cover and the drain hole,
the wall portion is formed projecting toward inside the rear cover, and
the output terminal is facing toward a ground surface at a time of being assembled to a vehicle.

2. The AC generator for vehicles of claim 1,
wherein the rear cover is provided with a ventilating window for introducing a cooling air into an area that faces the rectifier.

3. The AC generator for vehicles of claim 1,
wherein the output terminal is facing toward a ground surface at the time of assembling the AC generator to a vehicle.

4. The AC generator for vehicles of claim 1,
wherein the drain hole and the wall part are provided on both sides of the output terminal on the rear cover in the direction along a circumference of the rear cover.

5. The AC generator for vehicles of claim 1,
wherein the rectifier has a radiating fin, to which the output terminal is fixed, and
the wall part has a height set so that the adjoining part of the output terminal and the radiating fin is covered when seen through the drain hole in a direction perpendicular to the axial direction of the rotating shaft from outside of the rear cover.

* * * * *